United States Patent [19]

Pyle

[11] 4,446,454

[45] May 1, 1984

[54] HOME SECURITY SYSTEM

[76] Inventor: Ronald E. Pyle, 13400 Wisterwood, Austin, Tex. 78729

[21] Appl. No.: 226,626

[22] Filed: Jan. 21, 1981

[51] Int. Cl.³ .......................... G08B 1/08; H04Q 1/30

[52] U.S. Cl. .................................... 340/538; 340/521; 340/531; 340/533; 340/541; 367/197

[58] Field of Search ............... 340/517, 521, 531, 533, 340/538, 539, 541, 545, 546, 534, 506, 526–529; 367/197–199

[56] References Cited

U.S. PATENT DOCUMENTS

| | | | |
|---|---|---|---|
| 2,905,762 | 9/1959 | Rettie et al. | 340/531 |
| 3,925,763 | 12/1975 | Wadhwani et al. | 340/534 |
| 4,092,643 | 5/1978 | Stolarczyk | 340/541 |
| 4,187,497 | 2/1980 | Howell et al. | 340/539 |

*Primary Examiner*—Donnie L. Crosland

[57] ABSTRACT

A security system for alerting an intrusion disturbance at an entry point to a residence, or alerting as to other emergency conditions, such as fire is disclosed. In the system, a primary monitoring unit having intrusion detection sensors for placement at entry points to a residence produces an audible acoustic alarm signal upon the occurrence of an intrusion disturbance. The acoustic signal is detected by a secondary monitoring unit which in response transmits an electronic signal through the wiring in the residence. A central monitoring unit receives the transmitted electronic signal and activates an alerting alarm and automatic telephone dialer. The system may further include a portable alarm switch for transmitting a coded radio frequency signal to the central monitoring unit to provide remote activation of an alerting device.

5 Claims, 11 Drawing Figures

HOME SECURITY SYSTEM

BACKGROUND OF THE INVENTION

The present invention relates to security systems to alert an intrusion disturbance and other emergency conditions, such as fire and smoke, and medical emergency.

Heretofore, alarm systems designed to alert intrusion of a residence through entry points, such as doors and windows, have utilized sensors at the entry points. The sensors interconnect with a monitor which detects activation of a sensor and produces an alerting alarm. In such a system, the interconnecting wiring between the monitor and the sensors is desirably concealed, therefore making retrofitting of existing residences with the system expensive and impractical.

Alternatively, in other systems, to obviate the need for interconnecting wires, the sensors at each entry point connect to a radio frequency transmitter which sends a signal to a central receiver if sensor activation occurs. This type of alarm system is, however, undesirable because electromagnetic radiation interference tends to produce a high false alarm rate.

Accordingly, a security system which is reliable, and is economical and easy to install is greatly desired.

SUMMARY OF THE INVENTION

Recognizing the need for an improved security system, particularly for homes, a feature of the present invention is the use of acoustic communication links and existing, in-house wiring in the transmission of signals between system elements.

An additional feature of the invention is the provision for alerting both intrusion of a secured area and other emergency conditions, such as fire and smoke.

The present invention may be summarized in that an improved security system in accordance with the present invention includes a primary monitoring unit including intrusion detection sensors disposed proximate the entry points of the residence. When an entry point, such as a door or window, is opened by an intruder, the sensor is actuated, which in turn activates the primary monitoring unit. An audible acoustic alarm signal is generated by the unit, which propagates through the residence. A secondary monitoring unit is provided to detect the audible acoustic alarm signal. The secondary monitoring unit in response to the alarm signal generates an electronic signal, and, by coupling of the unit to the house wiring, transmits the electronic signal to a central monitoring unit. Upon detection of an electronic signal, the central monitoring unit initiates alerting activity. For example, external and internal alarm signals can be activated, lights can be turned on, and an automatic telephone dialer can be activated to place a call for assistance.

The security system of the present invention may readily incorporate therein fire and smoke detection sensors to provide for the initiation of alerting activity in response to such emergency condition. In such modification to the basic security system, the fire and smoke detection sensor generates an audible acoustic alarm signal which is detected by the secondary monitoring unit.

Yet further in accordance with the present invention, modular construction of a security system is provided, thereby permitting a customized security system to be tailored from standardized units. This feature greatly facilitates the installation of an optimum system regardless of the layout of the interior spaces of a residence. Accordingly, in a residence having several areas (i.e., living, sleeping, dining, utility, garage, etc.) substantially isolated one from the other, appropriate arrangement of primary and secondary monitoring units to completely protect a residence against unknown intrusion can be readily provided.

To summarize, a security system in accordance with the present invention may include a first group of primary monitoring units dispersed throughout a first portion of the residence, for example, the garage. Each primary monitoring unit would have one or more sensors with each sensor disposed proximate an entry point to the room. A first secondary monitoring unit would be disposed in proximity to the first group of primary monitoring units to receive an audible acoustic alarm signal issued from any one of the primary monitoring units in the group.

A second group of primary monitoring units would be dispersed throughout a second portion of the residence, for example, the living room. Each primary monitoring unit in the second group would include one or more intrusion detection sensors, with each sensor being disposed proximate an entry point. A second secondary monitoring unit would be disposed in proximity to the second group of primary monitoring units to receive an audible acoustic alarm signal issued by any one of the primary monitoring units in the second group.

Both the first and second secondary monitoring units would be coupled to the existing, in-house wiring of the residence, as by plug-in connection through a conventional wall socket. A single central monitoring unit coupled to the wiring in the residence would detect an electronic signal produced by either of the secondary monitoring units and transmitted over the house wiring. And, upon detection of an electronic signal, the central monitoring unit would activate an alarm device.

Depending upon the detection sensitivity of a secondary monitoring unit, and the floor plan and acoustic characteristics of a residence, a single secondary monitoring unit may be utilized to receive an audible acoustic alarm originating from a primary monitoring unit in one of several rooms. Therefore, as used herein, the terms "portion of a residence" and "area of a residence" should be understood to include both a single room or a group of rooms together.

As will be readily apparent, a security system in accordance with the present invention can be installed in virtually any residence or building regardless of the number of rooms or entry points.

BRIEF DESCRIPTION OF THE DRAWINGS

A written description setting forth the best mode presently known for carrying out the present invention, and of the manner of implementing and using it, is provided by the following detailed description of a preferred embodiment illustrated in the attached drawings in which.

DETAILED DESCRIPTION OF AN ILLUSTRATIVE EMBODIMENT

Figure 1:
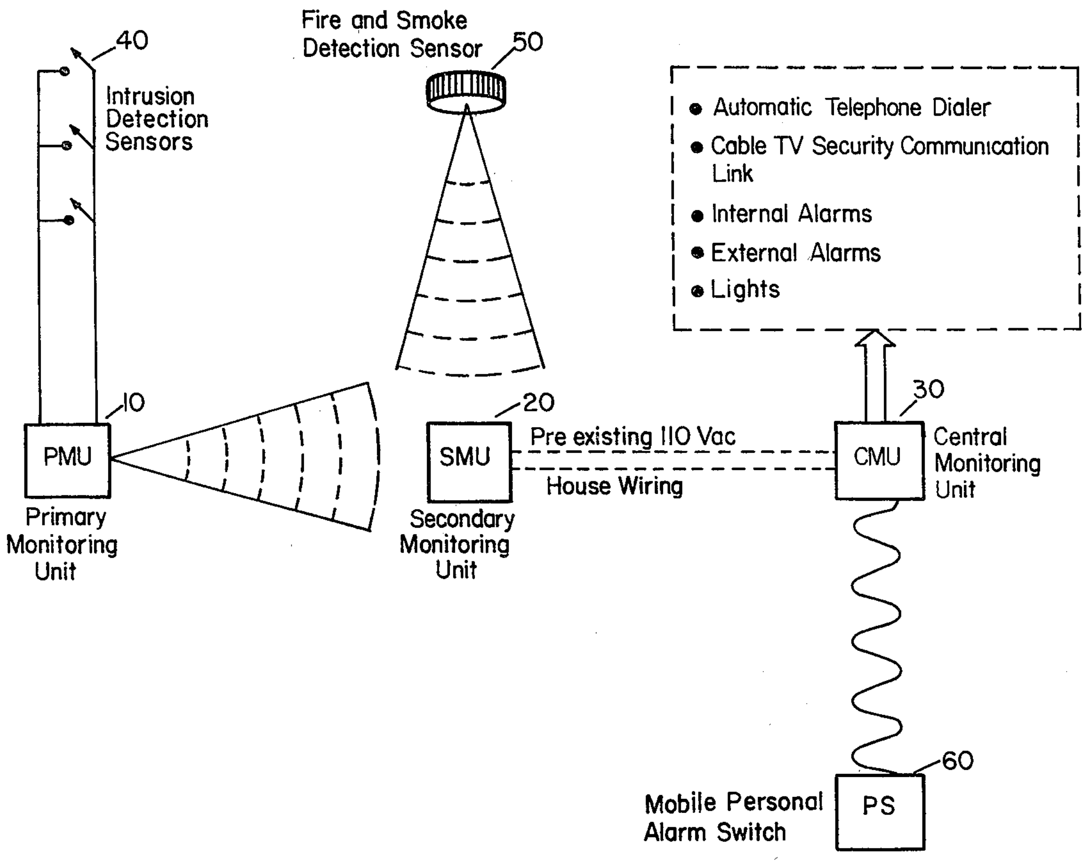
FIG. 1 is a diagram of the basic units of the security system of the present invention.

Referring to FIG. 1 of the drawings, a security system suitable for protection of a personal residence against intrusion and other emergency conditions, such as fire, is formed from a combination of standardized modular units. The basic units of the security system are a primary monitoring unit (PMU) 10, a secondary monitoring unit (SMU) 20, and a central monitoring unit (CMU) 30.

The primary monitoring unit 10 includes one or more intrusion detection sensors 40. Each intrusion detection sensor is adapted to be disposed proximate an entry point to a residence, for example, a window or door. Upon an intrusion disturbance at an entry point, the corresponding intrusion detection sensor activates the nearby primary monitoring unit 10. Upon activation, the primary monitoring unit generates an audible acoustic alarm signal.

The secondary monitoring unit 20, which is located proximate to the primary monitoring unit, detects the audible acoustic alarm signal and generates an electronic signal in response. The secondary monitoring unit 20 is coupled to the existing in-house electrical wiring, and the generated electronic signal is placed onto the in-house wiring for propagation thereover. Coupling of the secondary monitoring unit may be by a plug-in connection into an existing electrical outlet.

The electronic signal propagating over the wiring is detected by the central monitoring unit 30, which is similarly coupled to the in-house wiring. Upon detection of the electronic signal, the central monitoring unit initiates an alerting activity. Such activity may be one or more of several acts. For example, an automatic telephone dialer may be activated, a cable TV security communication link may be activated, lights may be turned on, and an alarm (internal or external) may be activated.

With respect to the intrusion detection sensors 40, any switch-type device, such as mechanical microswitches, magnetic switches, proximity switches, hall-effect sensors, photodiodes, phototransistors, or the like may be utilized. In other words, any type of device which may be utilized to sense the opening or closing of a door, window, or the like may be utilized. Mechanical microswitches and magnetic switches are preferred for most applications because of their simplicity and reliability. Also, while intrusion detection sensors will most typically be employed only on entry points, a sensor may also be utilized proximate the opening to a safe, the drawers of a desk, or the like.

As indicated in FIG. 1, a fire and smoke detection sensor 50 may be readily incorporated into the security system. A conventional fire and smoke detection sensor which provides an alerting acoustic alarm may be suitably utilized. The audible acoustic alarm signal produced by the fire and smoke detection sensor is detected by the secondary monitoring unit 20 and the normal operation of unit 20 will be initiated.

An additional, optional component to the security system is a portable alarm switch 60. This component may be carried by the home occupant or kept nearby. When the portable alarm switch is activated, a digitally coded radio frequency signal is transmitted to the central monitoring unit 30, causing immediate activation of internal and external alarms, lights, and the automatic telephone dialer. The mobile personal alarm switch 60 is advantageous in that if the home occupant discovers that someone may be attempting an intrusion, the switch can be activated immediately to call for outside assistance as well as sound an alarm that will discourage the intruder. This capability, of course, eliminates the dangerous and time-consuming task of attempting to telephone for outside help. Moreover, in the case of personal emergency, such as an illness, activation of the mobile alarm switch could be utilized to summon assistance leading to more immediate medical attention.

Figure 2:
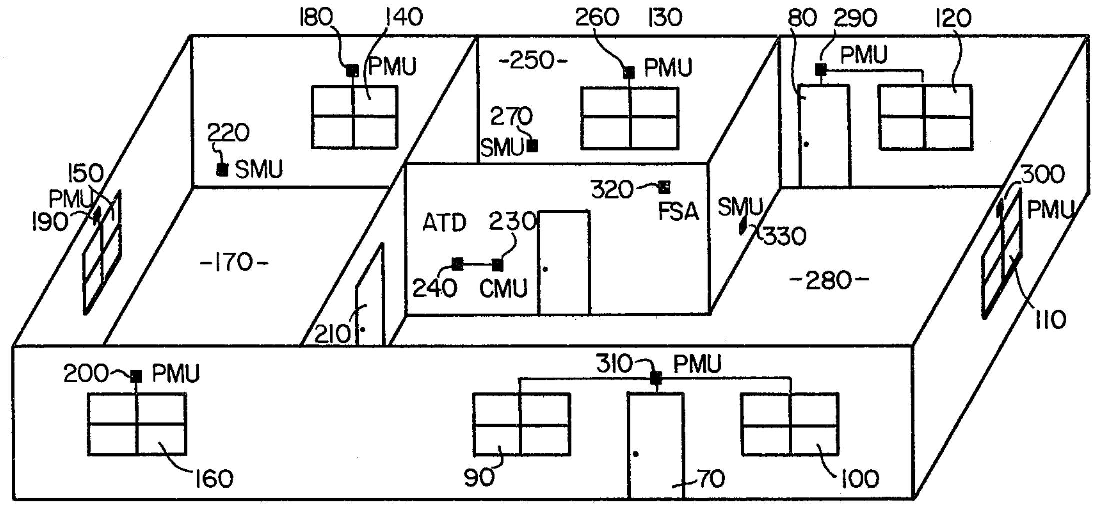
FIG. 2 is a diagram of the layout of a residence having a security system in accordance with the present invention installed therein.

Referring to FIG. 2, an example installation of the security system in accordance with the present invention is depicted. In the residence diagrammed, there are door entry points 70 and 80, and window entry points 90–160. As shown, in a first room 170 of the residence, three primary monitoring units 180, 190 and 200 are utilized. Unit 180 includes an intrusion detection sensor for detecting the opening of window 140. Unit 190 includes an intrusion detection sensor to detect the opening of window 150. Finally, unit 200 includes an intrusion detection sensor to detect the opening of window 160. Room 170 is isolated from the remainder of the house by reason of the closure of door 210. Accordingly, in room 170, there is placed secondary monitoring unit 220. If any one of the windows 140, 150, or 160 should be opened, an audible acoustic alarm will be generated by the corresponding primary monitoring unit. The acoustic alarm will be detected by the secondary monitoring unit and an electronic signal will be sent over the house wiring to central monitoring unit 230, which will in turn activate automatic telephone dialer (ATD) 240.

In room 250 of the residence, which contains a single window 130, a primary monitoring unit 260, having an intrusion detection sensor for detecting the opening of window 130 is mounted therein. In addition, a secondary monitoring unit 270 is placed in room 250 to detect the issuance of an audible acoustic alarm signal from primary monitoring unit 260, and transmit a signal over the house wiring to central monitoring unit 230.

In room 280 of the house, there is provided primary monitoring units 290, 300, and 310. Primary monitoring unit 290 includes a first intrusion detection sensor for detecting the opening of door 80, and a second intrusion detection sensor for detecting the opening of window 120. Primary monitoring unit 300 includes an intrusion detection sensor to detect the opening of window 110. Finally, primary monitoring unit 310 includes three intrusion detection sensors, one each for windows 90 and 100 and door 70.

In addition, a fire and smoke alarm (FSA) 320 is mounted on the wall in room 280.

A secondary monitoring unit 330 is placed in room 280. Upon the issuance of an audible acoustic alarm signal from any one of the primary monitoring units or the fire and smoke alarm, an electronic signal will be transmitted over the house wiring from unit 330 to the central monitoring unit 230.

In the example installation diagrammed in FIG. 2, a comprehensive security system is provided through the use of seven primary monitoring units, three secondary monitoring units, and a central monitoring unit. Additional components in the system are a conventional fire and smoke alarm, an automatic telephone dialer, and the required intrusion detection sensors and wiring therefor.

Figure 3:
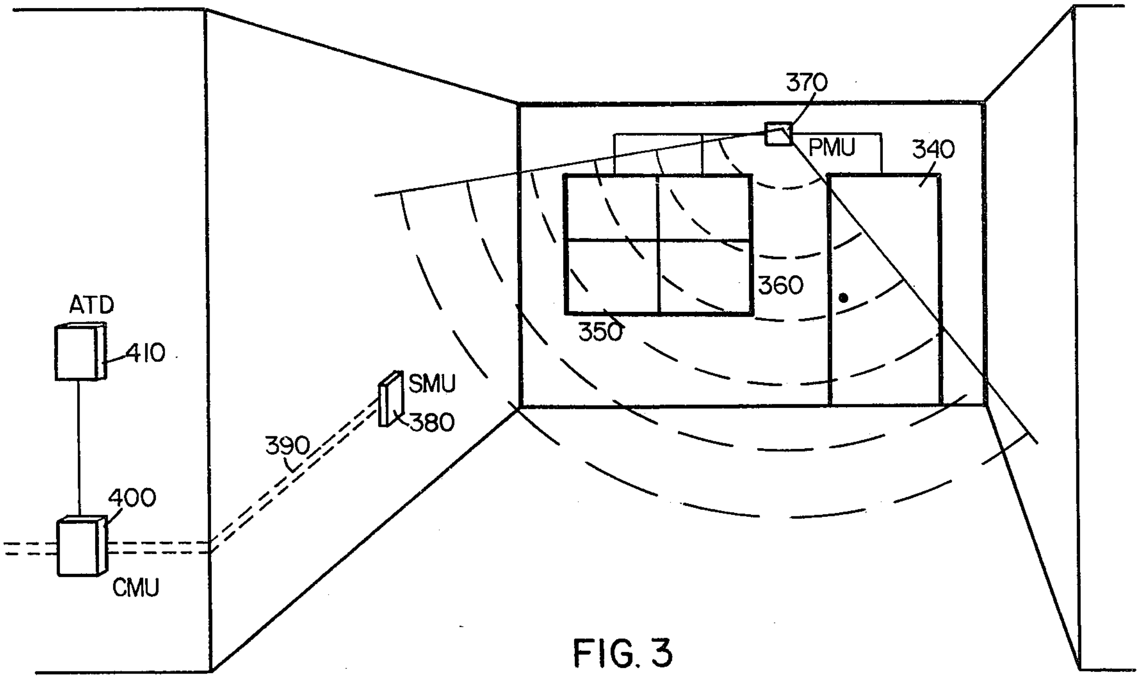
FIG. 3 is a diagram illustrating the manner of interaction between the basic units of the security system.

In FIG. 3, there is provided further illustration of the manner of operation of a security system in accordance with the present invention. As shown in FIG. 3, there are three entry points to the residence in the form of door 340 and windows 350, 360. A primary monitoring unit 370 has connected thereto three intrusion detection sensors, one each for the two windows and one for the door. A secondary monitoring unit 380 is mounted to the wall and interconnected with the electrical wiring 390 in the house, which leads to central monitoring unit 400. An automatic telephone dialer 410 is interconnected with central monitoring unit 400. When intrusion is attempted at any one of the entry points, an audible acoustic alarm is generated by the primary monitoring unit 370. The audible acoustic alarm signal propagates through the room as indicated by the diagrammed representation. The secondary monitoring unit detects the acoustic alarm signal from the primary monitoring unit. An electronic signal is then transmitted over the house wiring to the central monitoring unit 400. The central monitoring unit receives the electronic signal and activates the automatic telephone dialer.

Figure 4:
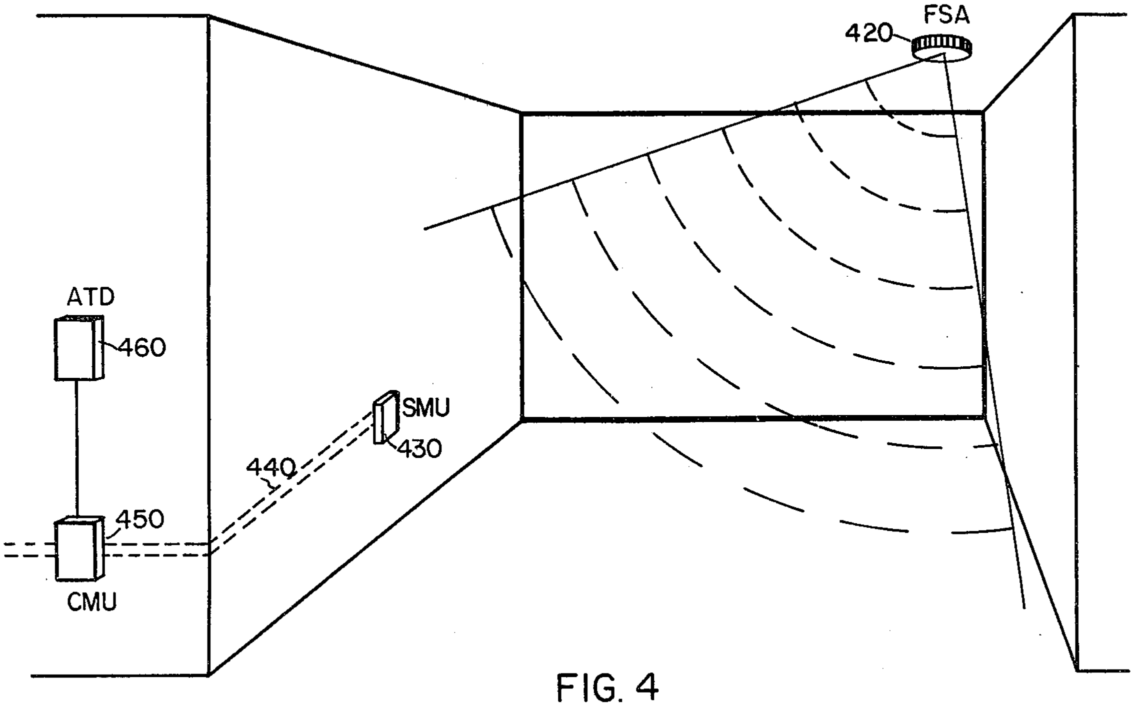
FIG. 4 is a diagram of the operational interaction of the home security system of the present invention with a conventional fire and smoke alarm detector.

FIG. 4 is similar to FIG. 3 except a conventional fire and smoke alarm detection sensor 420 is shown mounted to the ceiling of a room. When fire or smoke is detected, an audible alarm represented by the diagrammed lines propagates through the room. Secondary monitoring unit 430 detects the audible acoustic alarm from the fire and smoke detection sensor and transmits an electronic signal over the house wiring to a central monitoring unit 450. An automatic telephone dialer 460 is then activated to make a telephone call to a designated emergency number, for example, the police or fire department dispatcher.

Figure 5:
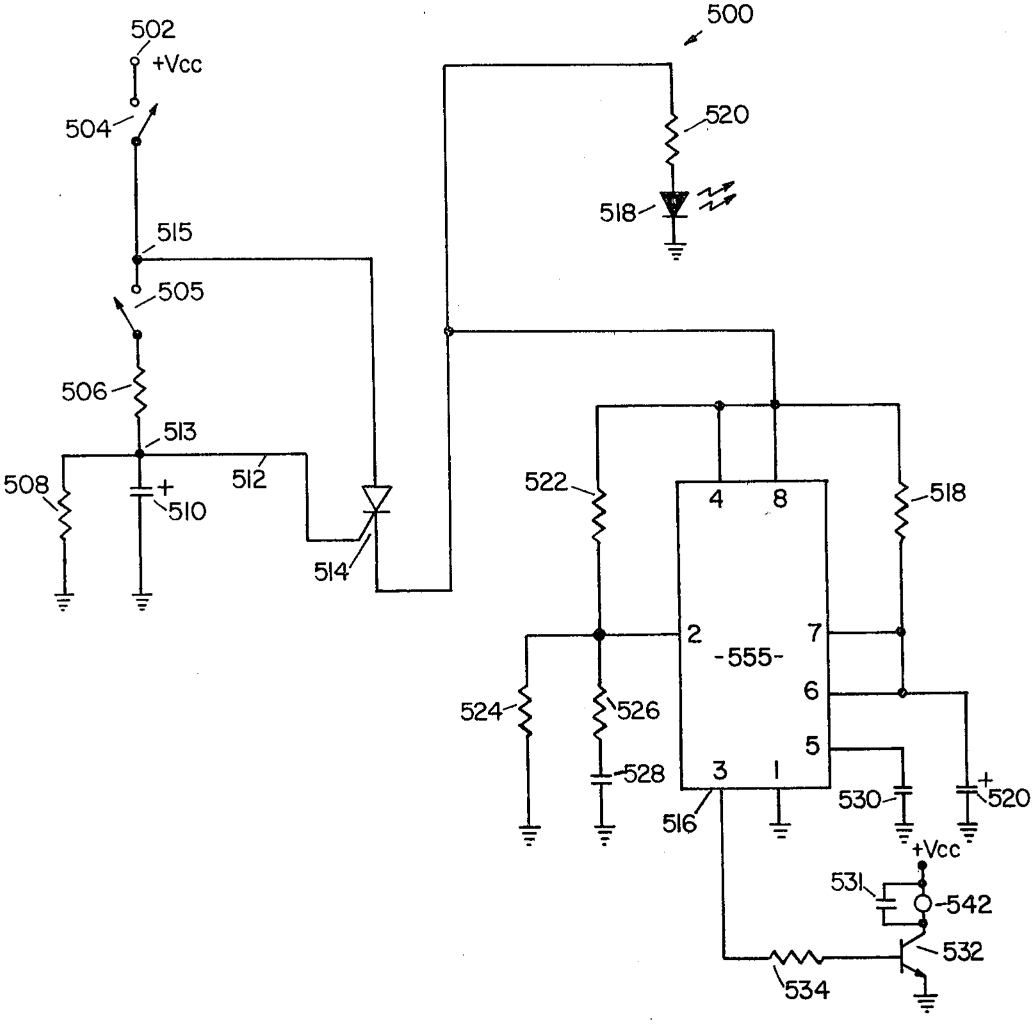
FIG. 5 is a schematic diagram of suitable circuitry for implementing the primary monitoring unit of the security system diagrammed in FIG. 1.

Referring now to FIG. 5, suitable electronic circuitry for implementing a primary monitoring unit module is diagrammed. The circuitry includes a power supply comprising a 9-volt battery (not shown) which is connected to terminal 502. An on-off arming switch 504 is connected to terminal 502 and to one terminal of a normally open intrusion sensor switch 505. Connected in series with switch 505 is an RC network comprising resistor 506 and 508 and capacitor 510. The gate of SCR 514 is connected via conductor 512 to the connection node 513 of the components of the RC network. The anode of SCR 514 is connected to node 515. The cathode of SCR 514 is applied to the voltage input to a timer circuit 516.

With arming switch 504 closed, the primary monitoring unit is ready for operation. In the event of an intrusion disturbance, normally open sensor switch 505 will assume the closed position. Closure of switch 505 applies electrical energy from the battery to the RC network. Current flow through resistor 506 charges capacitor 510 to a voltage level sufficient to "gate-on" SCR 514. A conduction path is established through SCR 514 between the battery power supply and timer circuit 516. Energization of circuit 516, of course, initiates its activity. Simultaneously, electrical power is applied to an intrusion indicator 500 in the form of a light emitting diode 518 having a series connected current-limiting resistor 520 connected thereto. Indicator 500 will indicate the intrusion occurrence to the owner until the system is reset or disarmed.

The RC network of resistors 506, 508 and capacitor 510 provides an exit and entry delay of any short duration, e.g. 5 seconds, to allow the owner to arm the system and exit the protected entry point, or to enter the protected entry point and disarm the system before activation of the audible alarm. Also, external key switch arming and disarming at main entry points may be incorporated, thereby obviating the necessity for exit and entry delays.

Timer circuit 516 may suitably comprise a NE555 integrated circuit device utilized in a monostable mode of operation. The timing period of the device's operation is established by an RC network comprising resistor 518 and capacitor 520. The RC network comprising resistors 522, 524, 526 and capacitor 528, which network is connected to the trigger input at pin 2 of the device, provides the trigger input to initiate operation of the timer circuit and thereafter prevent re-triggering until the unit is reset. A capacitor 530 is further provided and connected to the control voltage input (pin 5) of the device. When triggered, timer circuit 516 changes its output state and in effect "latches" into an "on" state.

The output signal available at pin 3 from timer circuit 516 is applied to a transistor circuit 532. Specifically, the output signal is applied to the base input of transistor 532 via resistor 534. By reason of an extremely long "on" period established for the output signal from timer circuit 516, which period is approximately four minutes, an essentially constant voltage is present on the base input of transistor 532 for a significant period of time. To the collector of transistor 532 is connected capacitor 531 in parallel with an audible alarm comprising a DC buzzer 542 capable of producing very high sound pressure levels with frequency components at or around 2700 Hertz.

Figure 6:
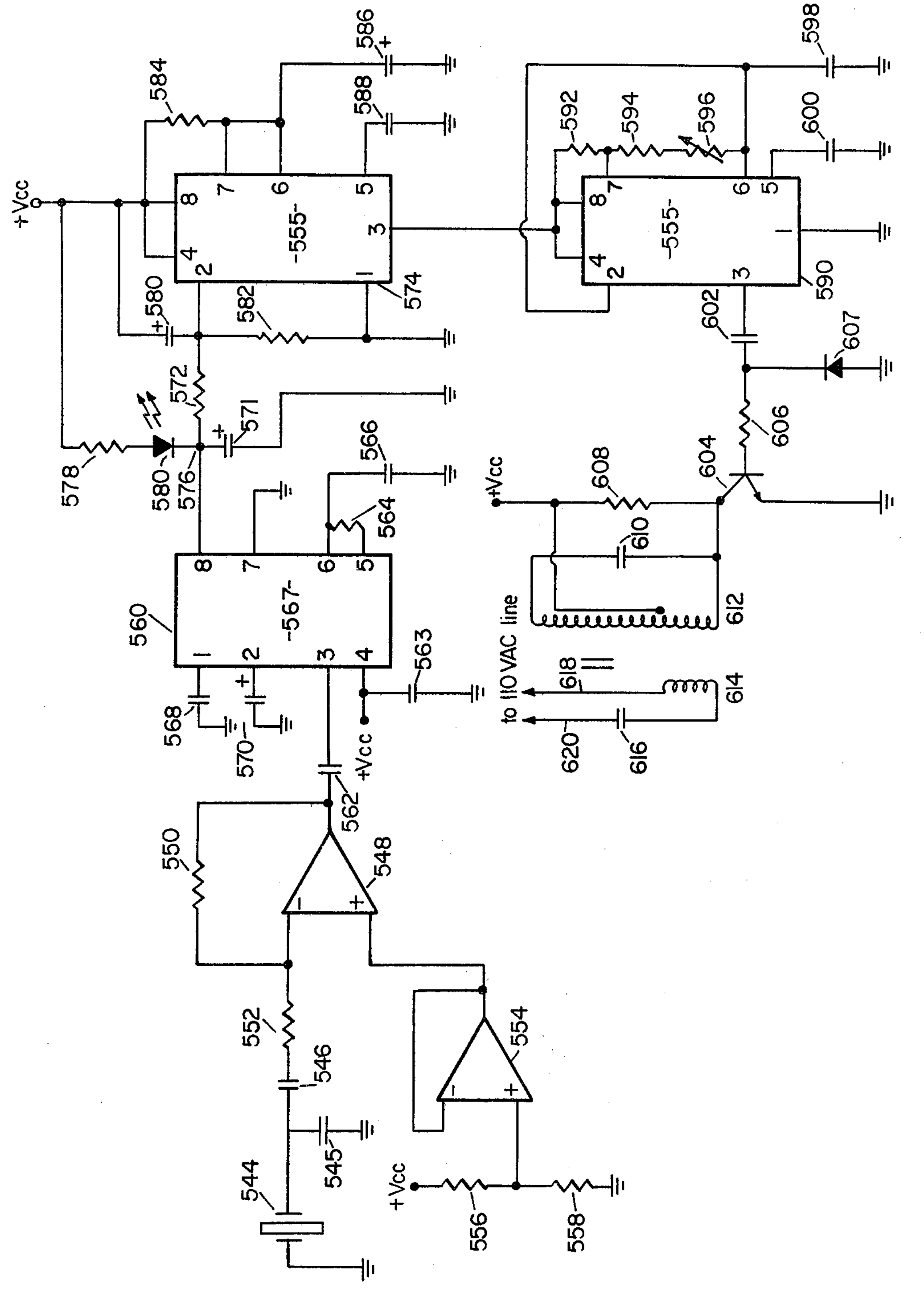
FIG. 6 is a schematic diagram of suitable electronic circuitry for implementing the secondary monitoring unit of the security system diagrammed in FIG. 1.

Referring next to FIG. 6, the audible acoustic alarm signal produced by a primary monitoring unit is detected by a piezoelectric transducer 544 having a narrow fundamental resonance at 2700 Hz. Transducer 544 is coupled via capacitor 546 to an amplifier circuit including operational amplifier 548. The gain of the amplifier is established by feedback resistor 550 and input resistor 552. The non-inverting input of operational amplifier 548 is connected to a reference voltage source including operational amplifier 554, which is configured as a unity gain amplifier, and a voltage divider network comprising resistors 556 and 558. This arrangement obviates the necessity for a power supply of plus and minus voltages to power op-amp 548.

After amplification, the transducer output signal is coherently detected by phase-locked loop (PLL) tone decoder 560 tuned to a center frequency of 2700 Hertz. The output of amplifier 548 is coupled to decoder 560 via capacitor 562.

The output signal of tone decoder 560, upon a lock detection, is a negative-going transition. This signal is applied through a network comprising capacitor 571, capacitor 580, resistor 582 and resistor 572 to the trigger input on timer circuit 574. The network provides a time delay of approximately two seconds. Therefore, to trigger timer 574, the "low" output state from PLL decoder 560 must exist continuously for at least two seconds. The time delay is variable as required by modification of component values. This time delay provides some measure of protection against transient acoustic signals having an energy content at or near 2700 Hz and, therefore, prevents false alarms from these spurious signals.

The negative-going transition also serves to pull node 576 toward ground potential low, thereby drawing current through resistor 578 and LED 580. In this manner, a lock indication is indicated.

Upon triggering, timer circuit 574, which operates in a monostable mode, changes the output state at pin 3 from ground potential to a positive voltage. The RC network comprising resistor 584 and capacitor 586 constitutes the timing network for timer circuit 574. The period during which the circuit is latched in the "on" state is approximately four minutes.

The output signal from timer circuit 574 is applied to a timer circuit 590 operating in an astable mode as a free-running oscillator. The frequency of oscillation is established by the RC network comprising resistor 592, resistor 594, potentiometer 596, and capacitor 598. The frequency is suitably 200 kHz.

The oscillator output is coupled via capacitor 602 to a transistor driver circuit including transistor 604 and base resistor 606. The load driven by the transistor driver circuit is an RLC circuit comprising resistor 608, capacitor 610 and coil 612. The circuit is tuned to the frequency of oscillation. Coil 612 is the primary of a transformer, the secondary winding 614 of which is connected in series with capacitor 616. In an installation of the security system, wherein the secondary monitoring unit is connected to the house wiring, leads 618 and 620 are connected via a conventional wall plug to the 110 volt ac line of the house wiring.

Once a primary monitoring unit is activated by an intrusion disturbance, the audible alarm signal must sound for two seconds before the secondary monitoring unit will activate. This is because of a built-in time constant which seeks to eliminate false alarms from transient acoustic phenomena, both inside and outside the home, having energy at or near the 2700 Hertz tone. The secondary monitoring unit would typically be disarmed while home occupants are present; however, the primary monitoring unit would maintain constant vigil at all times. The detection range of the secondary monitoring unit is up to approximately 100 feet depending upon the geometry and acoustic characteristics of the particular home.

Figure 7:
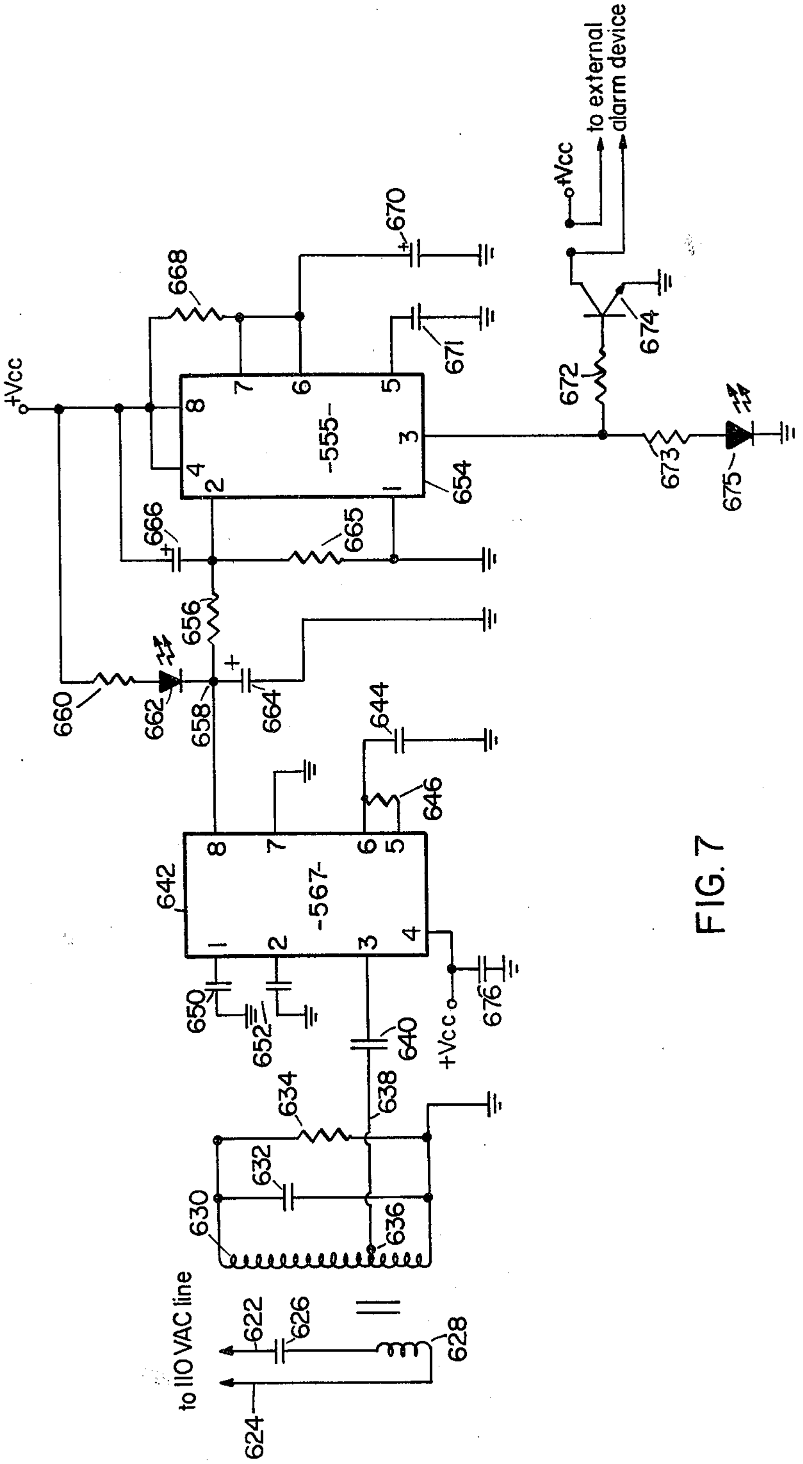
FIG. 7 is a schematic diagram of suitable electronic circuitry for implementing the central monitoring unit of the security system diagrammed in FIG. 1.

With regard to FIG. 7, a central monitoring unit module for activating an alert device is also adapted for connection to the 110 volt ac line in the house where a security system installation is to be made. Leads 622, 624 are connectable to the in-house electrical wiring. The leads connect to a series combination of capacitor 626 and coil 628. The coil is the primary winding of a transformer. The secondary winding 630 of the transformer is part of an RLC circuit which also includes capacitor 632 and resistor 634. A tap connection 636 is made on the secondary winding 630 to provide a signal conductor 638. The RLC network is tuned to the frequency of the electronic signals generated by the secondary monitoring units (i.e., 200 kHz). Accordingly, when an electronic signal of that frequency is present on the in-house wiring, the signal will be coupled through the transformer to appear on conductor 638.

The electronic signal on conductor 638 is coupled via capacitor 640 to a phase-locked loop (PLL) tone detector 642, which is tuned to the frequency of the electronic signal from the secondary monitoring units. Upon the existence of a lock condition, the output of tone decoder 642 makes a negative-going transition. This serves as a trigger input to timer circuit 654 applied via resistor 656. Simultaneously, by reason of node 658 being pulled toward ground, current flow is established through resistor 660 and light emitting diode 662 serving as a lock indication.

Timer circuit 654 is connected for operation in the monostable mode. Resistor 668 and capacitor 670 provide the timing network for the circuit. Upon triggering, the output state at pin 3 changes from a "low" condition to a "high" condition. This change in state provides current drive through resistor 672 to the base of transistor 674. An alert device (e.g., internal/external alarm siren, automatic telephone dialer, etc.) is to be connected to the collector of transistor 674. Accordingly, upon application of base current, the alert device would be activated by current flow therethrough. Also, a visual alarm indicator comprising light emitting diode 673 and resistor 675 is activated.

To prevent false alarms from transient broadband RF interference on the 110 volt ac line in the house, a time delay is built into the triggering of device 654. The triggering delay is selectable and is suitably several seconds in duration.

Figure 8:
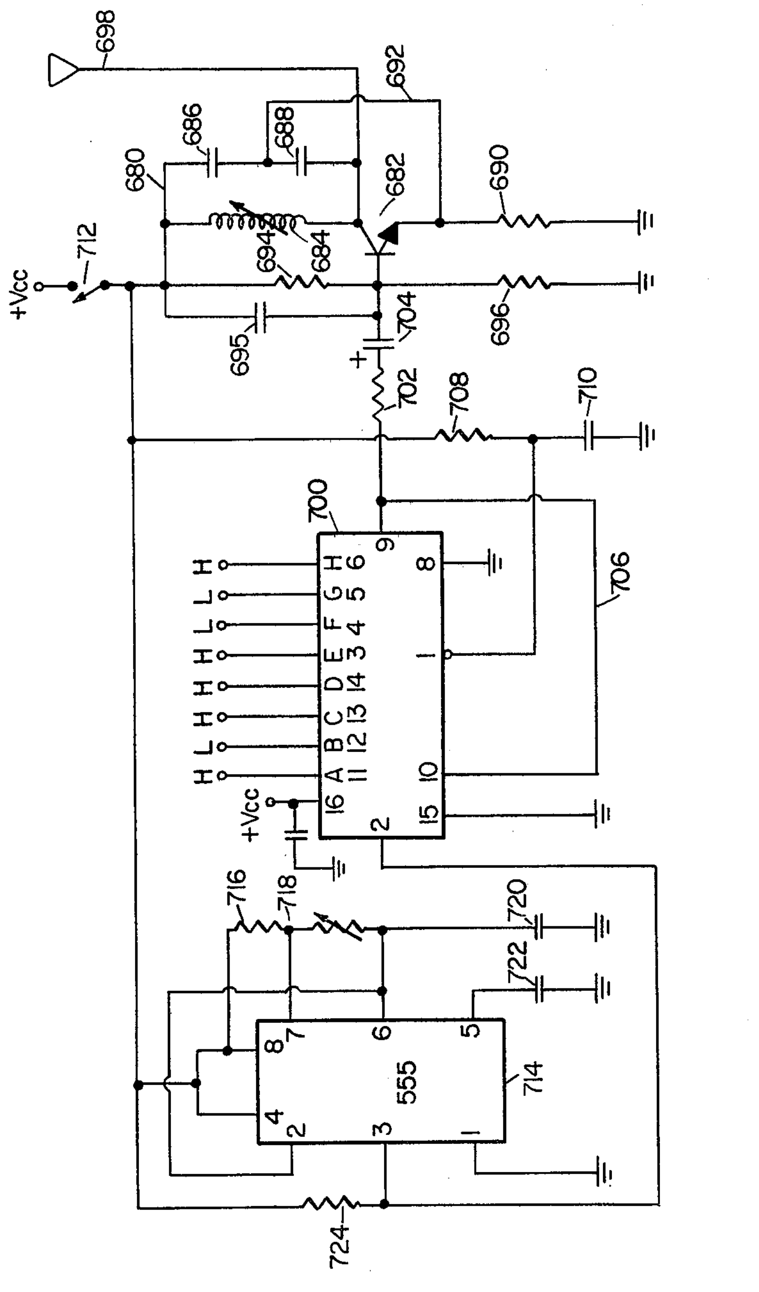
FIG. 8 is a schematic diagram of suitable electronic circuitry for implementing the mobile personal alarm switch of the security system diagrammed in FIG. 1.

Turning now to FIG. 8, suitable electronic circuitry for implementing the mobile personal alarm switch of the security system shown in FIG. 1 is diagrammed. The apparatus diagrammed is basically a digitally coded PCM radio frequency transmitter. The transmitter comprises an oscillator section 680 tuned to approximately 80 Megahertz. Suitably, the oscillator section comprises a Colpitts oscillator which includes transistor 682 and a tuned circuit of variable inductor 684 and capacitors 686, 688 connected to the collector. A resistor 690 is connected to the emitter. Also, a feedback connection 692 extends between the emitter and the tuned circuit. A bias network of resistor 694 and resistor 696 is connected to the base of transistor 682 to establish its operating point. An antenna 698 for radiating an RF signal is connected to oscillator 680.

The oscillator section is both amplitude and frequency modulated by a cyclical, serial eight-bit digital code produced by shift register 700. The cyclical, serial digital pulse code is applied to the oscillator through resistor 702 and capacitor 704.

Shift register 700 is suitably a parallel-load, eight-bit shift register such as a type SN74C165 device. The code to be transmitted is established at the parallel-in data inputs by hardwiring the inputs either "low" (L) or "high" (H). Repeated transmission of the digital code is provided by a connection 706 between the serial output $Q_h$ to the serial input. A load pulse for entering the coded data inputs into the shift register is provided by a RC circuit comprising resistor 708 and capacitor 710.

The load data signal is produced upon closure of power control switch 712.

Clocking of the shift register is produced by a timer circuit 714 connected in an astable mode of operation. The period of oscillation of the circuit is established by resistor 716, potentiometer 718, and capacitor 720. Suitably, timer circuit 714 produces a 1000 Hertz clock.

When the power control switch 712 is actuated to the "on" position, shift register 700 is loaded with the predetermined digital code. Also, timer circuit 714 is energized and begins outputting clock pulses to shift register 700, thereby causing it to cyclically output the selected digital code to the oscillator. Simultaneous to the activation of timer circuit 714 and shift register 700, the oscillator section is activated and an 80 Megahertz carrier begins emanating from antenna 698.

Figure 9:
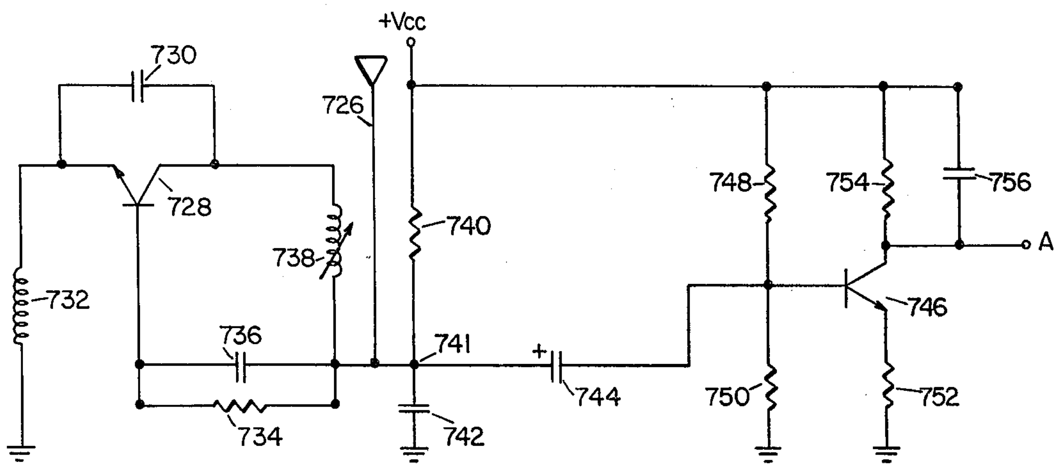
FIGS. 9–11 are schematic diagrams of electronic circuitry implementing a pulse code modulated receiver for incorporation in the central monitoring unit of the security system diagrammed in FIG. 1 to receive digitally coded transmissions from the mobile personal alarm switch.
Figure 10:
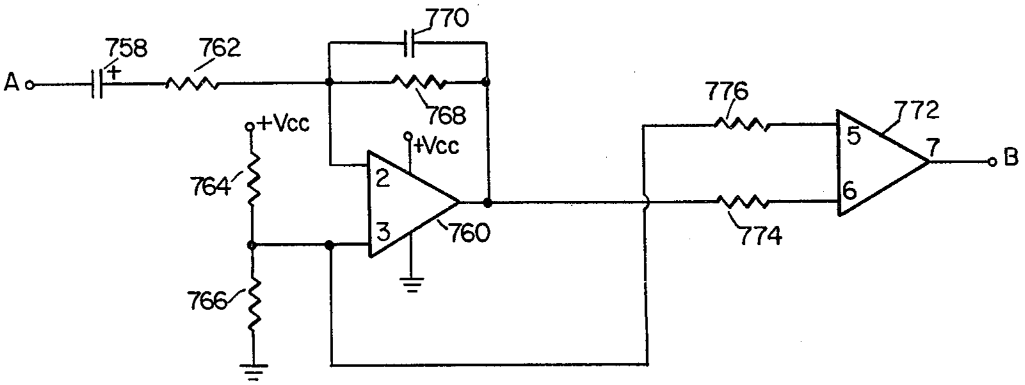
Figure 11:
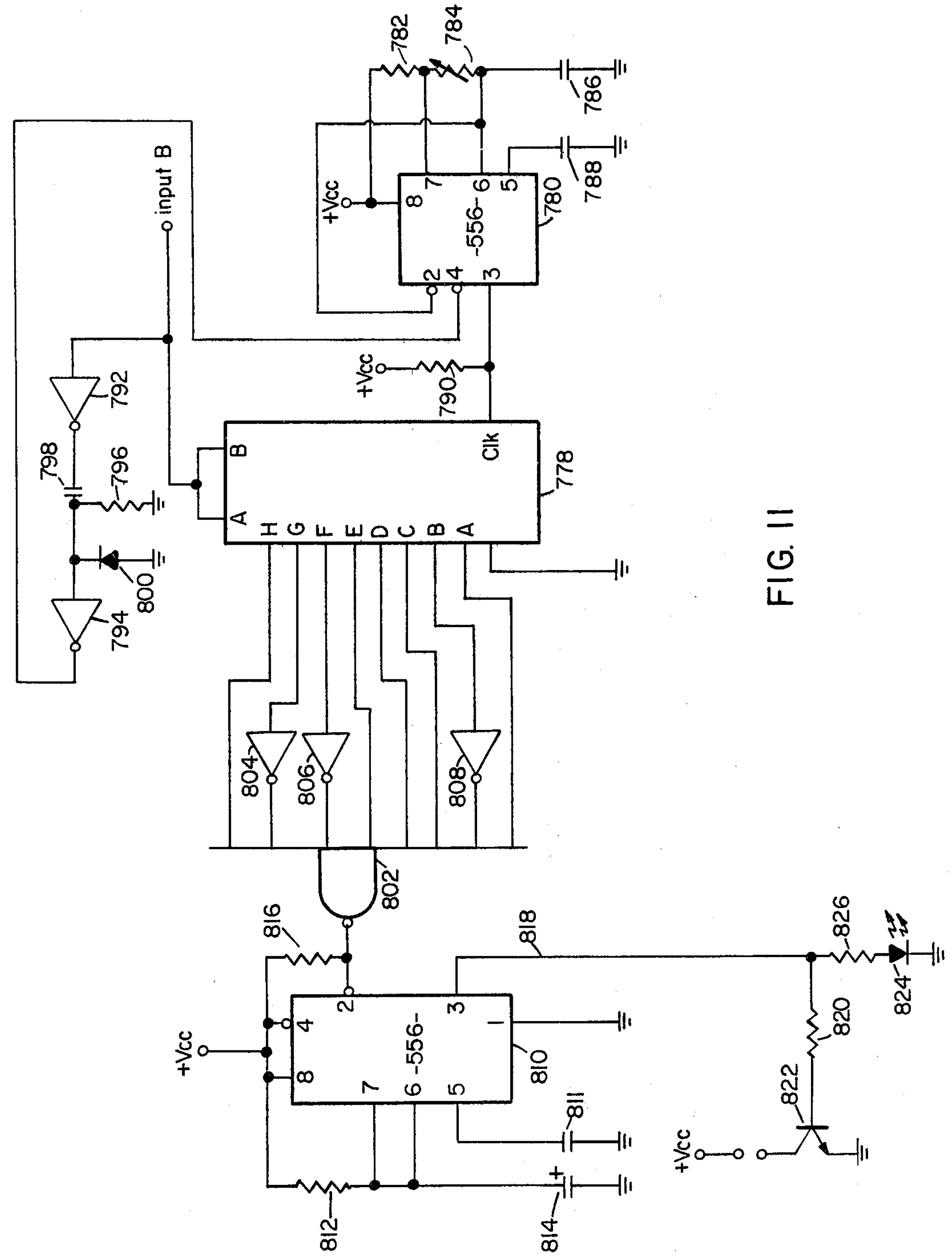

Referring now to FIGS. 9-11, there is diagrammed circuitry for implementing a PCM receiver for inclusion in the central monitoring unit of the security system to receive the coded radio frequency signal transmitted from the mobile personal alarm switch.

The radio frequency receiver and amplitude modulation detector shown in FIG. 9 comprises a simple super-regenerative detector followed by a first stage of audio amplification. An antenna 726 couples the coded radio frequency signal to the detector which includes transistor 728 having capacitor 730 shunted thereacross. An inductor 732 connects between the emitter of transistor 728 and ground. An RC network of resistor 734 and capacitor 736, which are connected in parallel, connect between the base of transistor 728 and antenna 726. A variable inductor 738 connects between the collector of transistor 728 and the RC network. The operation of the detector produces oscillations at node 741, which is the connection point of the detector to a RC network of resistor 740 and capacitor 742. The signal existing at node 741 corresponds to the serial pulse code transmitted from the mobile personal alarm; however, the pulse code signal is 180° out of phase.

The pulse code signal from the detector is coupled via capacitor 744 to a first stage of audio amplification. The audio amplifier is a conventional transistor circuit including a transistor 746, a biasing network of resistors 748 and 750, emitter resistor 752, and collector resistor 754 in parallel with capacitor 756. Resistor 754 and capacitor 756 provide 6 dB/octave of low pass filtering to assist in removing high frequency oscillation components from the desired pulse code signal. A 180° phase reversal takes place through the audio amplifier. Accordingly, the signal at terminal A is in-phase with the pulse code signal transmitted from the mobile alarm switch.

The amplified pulse code signal is applied to a second stage of audio amplification. The signal is coupled through capacitor 758 to an amplifier comprising operational amplifier 760. An input resistor 762 is connected to the inverting input of op-amp 760, and the non-inverting input is connected to a voltage divider network comprising resistors 764, 766. The feedback loop between the output and the inverting input of op-amp 760 includes resistor 768 and capacitor 770 which provides another 6 dB/octave of low pass filtering of the amplified pulse code signal.

The output of the second audio amplification stage is applied to a zero-crossing detector circuit. This circuit comprises an operational amplifier 772 having the inverting input thereto connected by resistor 774 to the output of op-amp 760. The non-inverting input of op-amp 772 connects by resistor 776 to a voltage divider network comprising resistor 764, 766. The zero-crossing detector shapes-up to logic levels the amplified digital pulse code signal. The resulting shaped signal is available at terminal B.

Referring to FIG. 11, the shaped digital code signal at terminal B is applied to a digital decoder. The digital code signal is applied to a serial-in, parallel-out shift register 778. The clock signal for shift register 778 is produced by timer circuit 780 operating in an astable mode. The frequency of oscillation is established by resistor 782, potentiometer 784 and capacitor 786. The frequency is matched to the transmit clock, and is accordingly 1000 Hertz. The clock signal generated by timer circuit 780 is continuously re-synchronized with the incoming data by application of a reset input derived from all "low-going" edges of the incoming data. Specifically, the reset signal to the timer circuit is generated by the circuitry comprising inverters 792 and 794, which are coupled together by an RC network including resistor 796 and capacitor 798 along with diode 800.

The shift register 778 parallel outputs connect to decode logic including eight-input NAND gate 802. Depending upon the pre-wired digital code in the mobile alarm switch, inverters are interposed between certain ones of the shift register outputs and NAND gate 802. For the digital code indicated in FIG. 8, (i.e., 10111001), inverters 804, 806 and 808 are connected as shown.

When the decode logic determines that the desired digital code is present in shift register 778, the output of NAND gate 802 makes a negative-going transition. This transition is applied as a trigger input to timer circuit 810. Timer circuit 810 is connected in a monostable mode of operation; and accordingly, it changes to the "on" state upon the occurrence of the triggering transition. The time period during which the timer circuit remains in the "on" state is determined by the values of resistor 812 and capacitor 814. Upon changing to the "on" state, timer circuit 810 produces as an output a "high" condition. As a result, current drive is produced over line 818 and through resistor 820 to transistor 822. Current flow is also produced through light emitting diode 824 and resistor 826 to provide a visual alarm indication. When current drive is applied to transistor 822, an alerting device load connected thereto is energized. Suitably the collector of transistor 822 is wired to the collector of transistor 674 in FIG. 7, such that either the PCM receiver or the central monitoring unit can activate the alerting device load.

List of Preferred Circuit Components

| | | |
|---|---|---|
| | FIG. 5 | |
| Resistor | 506 | 620K |
| | 508, 526 | 100K |
| | 522 | 1M |
| | 524, 518 | 10M |
| | 520 | 8.2K |
| | 534 | 820 |
| Capacitor | 510, 520 | 22 μf |
| | 528 | 0.1 μf |
| | 530, 531 | .01 μf |
| SCR | 514 | 2N5060 |
| Transistor | 532 | 2N3568 |
| Timer Circuit | 516 | NE555 |
| Buzzer | 542 | |
| LED | 518 | |
| | FIG. 6 | |
| Op-amp | 548, 554 | TL062 |
| Resistor | 556, 558, 578 | 4.7K |

-continued

| List of Preferred Circuit Components | | |
|---|---|---|
| | 552, 592 | 1K |
| | 594 | 2.2K |
| | 550 | 180K |
| | 564 | 36K |
| | 572 | 100K |
| | 582 | 1M |
| | 584 | 10M |
| | 596 | 500 Ohm Pot. |
| | 606 | 5.1K |
| | 608 | 300 |
| Capacitor 545 | .05 μf | |
| | 546, 616, 563 | 0.1 μf |
| | 562, 588, 600, 566 | .01 μf |
| | 568 | 0.2 μf |
| | 570, 586, 571 | 22 μf |
| | 580 | 10 μf |
| | 598, 610 | .001 μf |
| | 602 | .0022 μf |
| Phase Lock Loop | 560 | NE567 |
| Timer Circuit | 574, 590 | NE555 |
| Transformer | 612-614 | Toko # RAN-10A6729 |
| Piezoelectric transducer | | |
| Diode | 607 | 1N914 |
| LED | 580 | |
| | FIG. 7 | |
| Resistors | 646 | 3.9K |
| | 660 | 4.7K |
| | 656 | 100K |
| | 665 | 1M |
| | 668 | 10M |
| | 673, 634 | 1K |
| | 672 | 100 ohms |
| Capacitor | 626, 676 | 0.1 μf |
| | 632, 650, 644 | 1000 pf |
| | 652 | .005 μf |
| | 640, 671 | .01 μf |
| | 664, 670 | 22 μf |
| | 666 | 10 μf |
| Transistor | 674 | TIP 29 |
| Phase Lock Loop | 642 | NE567 |
| Timer Circuit | 654 | NE555 |
| Transformer | 628-630 | Toko # RAN-10A6845 |
| LED | 662, 675 | |
| | FIG. 8 | |
| Timer Circuit | 714 | NE555 |
| Shift Register | 700 | 74C165 |
| Resistor | 724, 696 | 4.7K |
| | 716 | 1K |
| | 718 | 1M Pot. |
| | 708 | 100K |
| | 702, 694 | 10K |
| | 690 | 180 |
| Capacitor | 720, 695 | .001 μf |
| | 722, 710 | .01 μf |
| | 688 | 5 pf |
| | 704 | 22 μf |
| | 686 | 22 pf |
| Inductor | 684 | .2 to .4 μH (Variable) |
| Transistor | 682 | 2N4124 |
| Switch | 712 | |
| | FIG. 9 | |
| Transistor | 728, 746 | 2N4124 |
| Inductor | 732 | 22 μH |
| | 738 | .2 to .4 μH (Variable) |
| Resistor | 734 | 470K |
| | 740 | 2.2K |
| | 748 | 100K |
| | 750 | 47K |
| | 752 | 180 |
| | 754 | 3.3K |
| Capacitor | 730, 736 | 5 pf |
| | 742 | .01 μf |
| | 744 | 22 μf |
| | 756 | .05 μf |
| | FIG. 10 | |
| Resistor | 762, 764, 766 | 4.7K |
| | 768 | 220K |
| | 776, 774 | 10K |
| Capacitor 758 | 22 μf | |

-continued

| List of Preferred Circuit Components | | |
|---|---|---|
| | 770 | 470 pf |
| Operational Amplifier 760, 772 | TL072 | |
| | FIG. 11 | |
| Resistor | 782, 826 | 1K |
| | 784 | 1M Pot. |
| | 790, 816 | 4.7K |
| | 796 | 100K |
| | 812 | 10M |
| | 820 | 100 |
| Timer Circuit | 780, 810 | NE556 |
| Shift Register | 778 | 74C164 |
| NAND gate | 802 | 74C30 |
| Inverters | 804, 806, 808, 792, 794 | 74C04 |
| Diode | 800 | 1N914 |
| Transistor | 822 | TIP 29 |
| Capacitor | 786 | .001 μf |
| | 788, 811 | .01 μf |
| | 798 | 100 pf |
| | 814 | 22 μf |
| LED | 824 | |

The foregoing description of the present invention has been directed to a particular embodiment thereof for purposes of explanation and illustration. However, it will be apparent to those skilled in this art that many modifications and changes in the embodiment shown may be made without departing from the teachings of the present invention. Accordingly, that subject matter which Applicant regards to be his invention is set forth in the following claims.

What is claimed is:

1. A security system for a home having at least one entry point and pre-existing electrical wiring for distributing electrical power therein, the system comprising:

an intrusion detection sensor proximate said entry point, for sensing an intrusion at said entry point and providing an intrusion detection signal in electrical form in response to sensing said intrusion;

a primary monitoring unit near said intrusion detection sensor and electrically coupled thereto, and including means for selectively deactivating said primary monitoring unit, said primary monitoring unit receiving said intrusion detection signal and providing a primary alarm signal in human audible form a first predetermined time period after receiving said intrusion detection signal unless selectively deactivated within said first time period;

a secondary monitoring unit within the audible range of the primary monitoring unit and electrically coupled to said wiring, and including means for selectively deactivating said secondary monitoring unit, said secondary monitoring unit detecting said primary alarm signal and providing an alarm detection signal in electrical form via said wiring a second predetermined time period after detecting said primary alarm signal unless selectively deactivated within said second time period; and a central monitoring unit electrically coupled to said wiring, and including means for selectively deactivating said central monitoring unit, said central monitoring unit receiving said alarm detection signal and providing a secondary alarm signal in human perceivable form a third predetermined time period after receiving said alarm detection signal unless selectively deactivated within said third time period.

2. The security system of claim 1 further including:

a fire detection sensor for sensing a fire within a predetermined range thereof and providing a second primary alarm signal in human audible form in response to sensing said fire;

wherein the fire detection sensor is disposed so that the secondary monitoring unit is within the audible range thereof, and wherein the secondary monitoring unit also detects said second primary alarm signal and provides said alarm detection signal in response to the detection thereof.

3. The security system of claim 1 wherein the home has a group of entry points in relatively close proximity, the system further including a plurality of said intrusion detection sensors, each proximate a respective one of said entry points and providing a respective intrusion detection signal in response to sensing an intrusion at said respective entry point; and wherein said primary monitoring unit is electrically coupled to each of said plurality of intrusion detection sensors and provides said primary alarm signal in response to receiving any of said intrusion detection signals.

4. The security system of claim 1 wherein the home has a second entry point relatively near said other entry point, the system further including:

a second intrusion detection sensor proximate said second entry point, for sensing an intrusion at said second entry point and providing a second intrusion detection signal in electrical form in response to sensing said intrusion; and a second primary monitoring unit near said second intrusion detection sensor and electrically coupled thereto, and including means for selectively deactivating said second primary monitoring unit, said second primary monitoring unit receiving said second intrusion detection signal and providing a second primary alarm signal in human audible form a fourth predetermined time period after receiving said second intrusion detection signal unless selectively deactivated within said fourth time period; and wherein said secondary monitoring unit is within the audible range of both of the primary monitoring units and provides said alarm detection signal in response to detecting either of said primary alarm signals.

5. The security system of claim 1 wherein the home has a second entry point relatively far from said other entry point, the system further including:

a second intrusion detection sensor proximate said second entry point, for sensing an intrusion at said second entry point and providing a second intrusion detection signal in electrical form in response to sensing said intrusion;

a second primary monitoring unit near said second intrusion detection sensor and electrically coupled thereto, and including means for selectively deactivating said second primary monitoring unit, said second primary monitoring unit receiving said second intrusion detection signal and providing a second primary alarm signal in human audible form a fourth predetermined time period after receiving said second intrusion detection signal unless selectively deactivated within said fourth time period; and a second secondary monitoring unit within the audible range of the second primary monitoring unit and electrically coupled to said wiring, and including means for selectively deactivating said second secondary monitoring unit, said second secondary monitoring unit detecting said second primary alarm signal and providing a second alarm detection signal in electrical form via said wiring a fifth predetermined time period after detecting said second primary alarm signal unless selectively deactivated within said fifth time period; and wherein said central monitoring unit receives both of said alarm detection signals and provides said secondary alarm signal in response to receiving either of said alarm detection signals.

* * * * *